United States Patent [19]

Piascinski et al.

[11] Patent Number: 4,656,522

[45] Date of Patent: Apr. 7, 1987

[54] METHOD FOR LAMINATING A SAFETY PANEL TO A CRT AND THE PRODUCT THEREOF

[75] Inventors: Joseph J. Piascinski, Upper Leacock Township, Lancaster County; Randolph H. Axelrod, Warwick Township, Lancaster County, both of Pa.

[73] Assignee: RCA Corporation, Princeton, N.J.

[21] Appl. No.: 705,650

[22] Filed: Feb. 26, 1985

[51] Int. Cl.⁴ .............................................. H04N 5/65
[52] U.S. Cl. .................................... 358/247; 313/478; 313/479
[58] Field of Search ................ 358/247; 313/478, 479, 313/477

[56] References Cited

U.S. PATENT DOCUMENTS

| | | | |
|---|---|---|---|
| 3,051,782 | 8/1962 | Giacchetti et al. | 358/247 |
| 3,130,854 | 4/1964 | Casciari | 220/2.1 |
| 3,305,123 | 2/1967 | Nordby | 220/2.1 |
| 3,311,700 | 3/1967 | Bulcraig | 178/7.82 |
| 3,708,622 | 1/1973 | Brown | 358/247 |
| 3,909,524 | 9/1975 | Ohkoshi et al. | 178/7.85 |
| 4,031,553 | 6/1977 | Sumiyoshi et al. | 358/247 |
| 4,204,231 | 5/1980 | Permenter | 358/247 |
| 4,485,329 | 11/1984 | Donofrio et al. | 358/247 |

*Primary Examiner*—Edward L. Coles, Sr.
*Attorney, Agent, or Firm*—Eugene M. Whitacre; Dennis H. Irlbeck; Vincent J. Coughlin, Jr.

[57] ABSTRACT

Method comprises positioning a transparent safety panel in close spaced-apart relationship with the viewing window of a CRT and producing a mechanically-strong, hydraulically-tight closure between the panel and window around the margins thereof. The cell formed thereby is filled with curable liquid resin with the window and panel in an essentially vertical orientation. After bubbles have cleared and inspection completed, the liquid resin filling the cell is cured to an optically-clear solid.

13 Claims, 6 Drawing Figures

METHOD FOR LAMINATING A SAFETY PANEL TO A CRT AND THE PRODUCT THEREOF

BACKGROUND OF THE INVENTION

This invention relates to a method for laminating a transparent safety panel to the screen-bearing viewing window of a CRT (cathode-ray tube) and particularly, but not exclusively, to a large CRT, and to the product of that method. By "large CRT" is meant a television picture tube or an information display tube having a viewing window bearing a viewing screen of at least a 30V size.

In one prior type of CRT, a glass safety panel is laminated to the viewing window of the CRT in order to reduce the danger of implosion and also, should the CRT implode, to reduce the danger of injury to people and things nearby. Suitable structures and methods for laminating CRTs smaller than 26V screen dimension have been described previously, for example, in U.S. Pat. No. 4,204,231 issued May 20, 1980 to M. M. Permenter.

In one prior laminating method, a safety panel is positioned in a desired spaced-apart relationship with a CRT window, and then a strip of flexible pressure-sensitive tape is wrapped around the edges of the CRT and panel to define a closed cell between the window and the panel. Thereafter, the cell is filled with a catalyzed liquid resin and allowed to cure to a clear transparent solid which adheres to the facing surfaces of the panel and the window. During the filling step, vent holes are punctured in the tape to allow air in the cell to escape. After the cell is filled with resin, the holes are taped shut to prevent both the leakage of resin and the formation of bubbles in the cell during the curing step. A foam tape with adhesive on both sides adhered to the margins of the panel and the window may replace the tape in the foregoing method.

In the foregoing method, the cell is filled with the viewing window positioned in a generally horizontal attitude, with the window facing downward. The tape provides a temporary hydraulic seal for the cell, and is also sufficiently strong to hold the panel temporarily in the desired downward-facing, spaced-apart relationship while the cell is being filled and the resin cures. In practice, especially when safety panels are laminated to CRT windows larger than about 25V-size, the taping step is not efficient and many temporary seals leak resin, and some seals fail to hold the safety panels in place. Also, because the windows face downward, it is difficult to determine whether gas bubbles are present in the viewable area in front of the window.

Because of the size and weight of a large CRT as defined above, all of these problems are aggravated and these prior methods are not practical for laminating a safety panel to the window of a large CRT. For example, a 25V-size CRT weighs about 55 pounds, while a 33V-size CRT weighs about 130 pounds and therefore cannot be handled manually in the factory. A cell, formed as described above, on a 33V-size CRT is difficult to fill with liquid resin with the window facing down because of the greater weight of the safety panel and because the greater weight of the resin causes greater leakage of resin during the filling and curing steps, especially through the venting holes in the tape. The tapes used in the prior methods to form the cell are not reliable to hold an 11-pound safety panel and about 8 pounds of liquid resin in the desired spaced apart relationship during the filling and curing steps. Sagging and wedging of the panel position and leakage and "flow-out" of the resin occur frequently with prior methods.

SUMMARY OF THE INVENTION

The novel method overcomes the above-mentioned problems by modifying the prior methods in several important respects. The cell is formed with a permanent, solid, mechanically-strong, hydraulically-tight closure between the window and the panel. The cell is filled with liquid resin with the window in a generally vertical attitude, that is, with the window facing sideward so that air can escape from the cell without puncturing the closure, and bubbles in the resin can rise and clear away from in front of the viewing area of the window.

In one form of the novel method, the safety panel is positioned in the desired spaced-apart relationship with the window and then caulking material is forced between the panel and window around the margins thereof, while the window is facing either upward or downward. Then, the assembly is repositioned with the window facing sideward, and the cell is filled with catalyzed liquid resin, which is permitted to cure. Because of the character of the closure and the sideward facing position of the viewing window, little or no leaking of resin occurs, the resin clears of bubbles more readily, and the window can be inspected easily for bubbles and other imperfections in the resin during the filling and curing steps.

The product of the novel method is a CRT with a safety panel bonded to the window thereof with both an optically-clear, transparent resin and a mechanically-strong, hydraulically-tight closure around the margins thereof.

DETAILED DESCRIPTION OF THE PREFERRED EMBODIMENT

Figure 1:
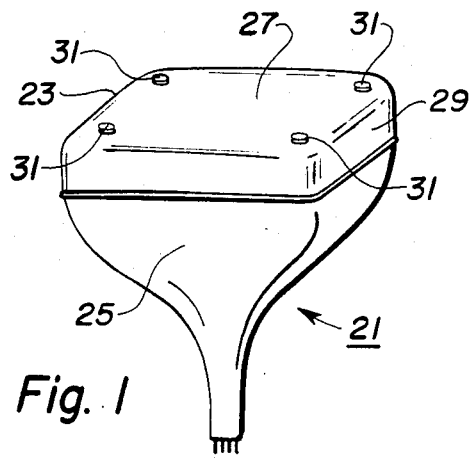
FIG. 1 is a perspective view of a CRT to be laminated by the novel method with spacers on the window thereof in a horizontal orientation ready to receive a safety panel.

FIG. 1 shows a finished, operable CRT 21 including a glass faceplate 23 bonded to a glass funnel 25. The faceplate 23 comprises a screen-bearing viewing window 27 and a peripheral sidewall or flange 29. The CRT may be a television tube, a data display tube, a radar display tube, or any other type of CRT having a luminescent screen supported on the inside of and viewed through the viewing window of the faceplate.

To start the novel method, a cleaned safety panel 33, having a contour similar to that of the viewing window 27, is temporarily spaced about 2.54 mm (100 mils) from the window 27. In this example, four round spacers 31 about 100 mils thick of cured silicone resin are placed in each corner, slightly in from the edge, of a rectangular 33V-size television picture tube as shown in FIG. 1. Three such spacers are enough, although four are preferred. Such spacers, which may be of any desired thickness, may be punched or cut from a cast sheet of the same resin as is used for laminating the safety panel to the viewing window. Circular spacers are preferred because they have less tendency to trap gas bubbles.

Figure 2:
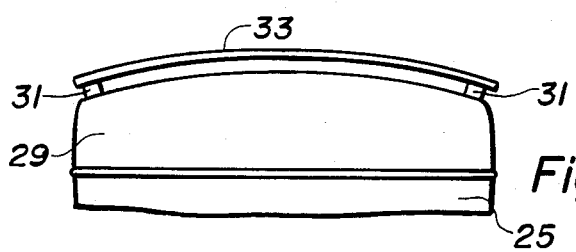
FIG. 2 is a broken-away, elevational view showing a safety panel spaced from the viewing window of the CRT shown in FIG. 1.

Then, the safety panel 33 is placed on top of the spacers 31 as is shown in FIG. 2, while the window 33 is in a substantially horizontal orientation facing up. The orientation could be substantially horizontal facing down, in which case, spacers would be placed on the inside surface of the safety panel and then the viewing window would be placed on top of the spacers. Another alternative is to cement the spacers to the panel and/or the window prior to assembling them. Spacers can be omitted entirely and the panel may be held in the desired spaced relationship during the next few steps with a mechanical contrivance.

The inner contour of the safety panel 33 conforms substantially, but not exactly, with the outer contour of the viewing window 27. Hence, the space between the panel and the window will vary somewhat from spacer to spacer. The novel method accommodates to these variations.

Figure 3:
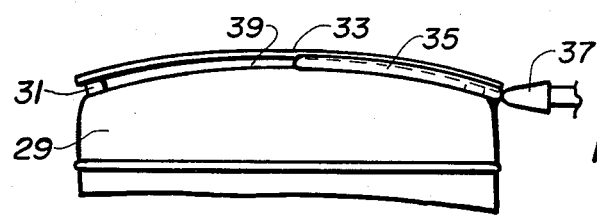
FIG. 3 is similar to FIG. 2, showing caulking material being dispensed between the viewing window and the safety panel.

With the safety panel spaced from the window, a viscous plastic caulking material 35, which may be an RTV (room-temperature vulcanizing) silicone resin is forced into the space around and along the margins of the panel 33 and window 27, as shown in FIG. 3 through a first nozzle 37. A gap 39 is left along the margin of one of the long sides to function as a fill hole in subsequent step. In this example, a bead of General Electric RTV 102 resin (marketed by General Electric Co., Waterford, N.Y.) is dispensed around the margins of the window 27 leaving a gap 39 at the 12 o'clock position of the window 27. Other caulking materials that can be used to prepare the gasket are General Electric RTV 108 and Dow-Corning RTV 732 (marketed by Dow-Corning, Midland, Mich.). Two-component thixotropic, heat-curing materials can also be used for caulking.

After dispensing the caulking material 35, it cures by exposure to humid air to form a gasket 35A that is between, and strongly-adherent, to both the margins of the safety panel 33 and the viewing window 27. Furthermore, the gasket 35A forms a hydraulically-tight seal to both the panel 33 and the window 27. Thus, the gasket 35A can hold considerable weight and also can resist considerable hydrostatic pressure. The method and time for curing the gasket 35A formed by the caulking material 35 depends upon the particular caulking material that is used.

After the caulking material 35 is substantially cured, the closure formed is baked at temperatures up to about 100° C. to outgas the material. In this example with RTV 102, the cured gasket 35A is baked at about 80° C. for about 60 minutes to outgas the assembled structure. Then, the assembly is cooled to room temperature. If the gasket 35A does not form bubbles during subsequent steps, the outgassing step may be omitted.

At this point, the window 27, closure 35A and panel 33 define a cell that is leakproof and can support a large quantity of liquid resin without sagging or deforming.

Figure 4:
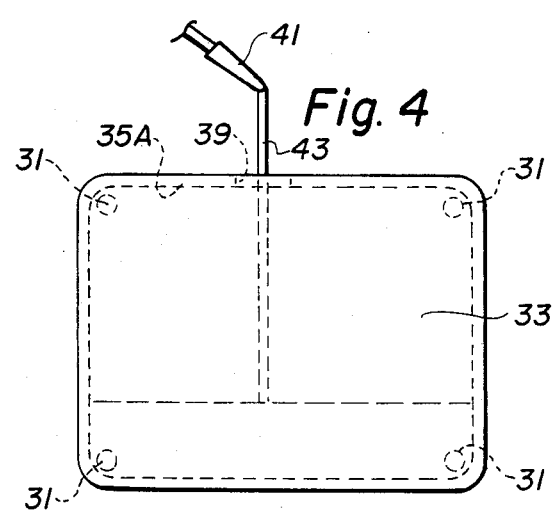
FIGS. 4 and 5 are front and side elevational views respectively of the safety panel in a vertical orientation while the cell between the viewing window and safety panel is being filled with curable liquid resin.
Figure 5:
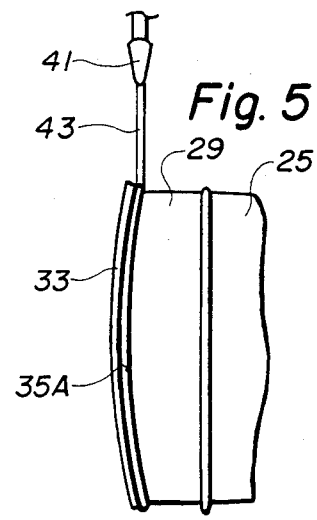

The assembly is positioned with the window 27 in a substantially vertical attitude; that is, facing sideward, as shown in FIGS. 4 and 5. The cell is filled with a liquid resin 43 that is curable to a transparent solid that adheres to both the panel and the window. In this example, the cell is filled with two-component, catalyzed, degassed General Electric RTV 615, which is a slow-curing silicone resin, dispensed from a second nozzle 41 in a stream 43. Other slow-curing resins, such as Dow 720 epoxy resin (marketed by Dow Chemical Co., Midland, Mich.) and Freeman 80-3297 polyester resin (marketed by Freeman Chemical Corp., Port Washington, Wis.), may be used.

Because of the vertical attitude of the window 27 and the cell, any bubbles that form can rise rapidly through the liquid resin. The clearing of bubbles from the viewing area of the window 27 usually takes only several minutes of standing after the filling step has been completed. Also, because of the vertical attitude of the window 27 during and after filling, the assembly is easily and conveniently inspected visually for bubbles and other blemishes.

After all bubbles have cleared from the viewing area of the window 27, the curing of the liquid resin is accelerated by heating the resin in the cell at about 70° C. until the resin is cured. This heating may be carried out with infrared radiant heaters in front of the viewing window 27. In this example, the heating is carried out in a circulating oven for about 4 hours.

Figure 6:
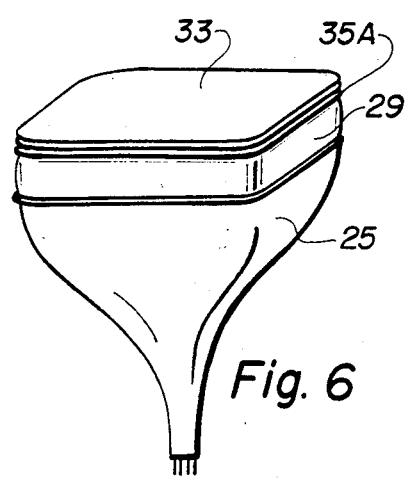
FIG. 6 is a perspective view of the CRT of FIG. 1 with the safety panel laminated thereto.

The product of the novel method is shown in FIG. 6. It consists essentially of the CRT 21 shown in FIG. 1 with a safety panel 33 bonded to the viewing window 27 with a gasket 35A of cured caulking material and also cured, optically-transparent resin.

An alternative method for laminating a tube would be to use an ultraviolet-curing resin. In this procedure, the tube-safety window cell is filled with a uv-curing resin and inspected for bubbles. After all the bubbles are removed, the filled cell is placed before a uv source to initiate polymerization. Some advantages of this procedure are that mixing of the components is not required and less energy than heating for curing is required.

With the advent of data display tubes and the tightening of finished tube specifications, the choice of resin systems is narrowing. With polyester resins, the prior laminated tube had a defect known as "sparkle". Sparkle is present in all polyester-laminated tubes. The "sparkle" phenomenon appears to look like small transparent sections of darker colored resin than the adjacent resin. The sparkle phenomenon was present in prior television picture tubes and was tolerated. However, because of the stringent requirements of high-resolution data display tubes, the "sparkle" defects are undesirable. General Electric 615 silicone resin does not have a sparkle problem, and is, therefore, the preferred curable liquid resin.

The self-supporting safety panel-gasket system produced by the novel method has several advantages over prior structures:

1. The closure can support larger glass-safety-panel weight and laminating-resin weight than foam gasketing tape or pressure-sensitive laminating tape without sagging or wedging.

2. The closure does not leak because of excellent bond between safety panel and the window of the tube; hence, there is no need to clean up resin that has fallen on tube handling equipment or on the floor. Also, because there is no leakage, there is no excessive resin waste.

3. Tubes can be examined for bubble scrap before the application of heat and for other causes for rejection and be recycled at lower cost before curing the liquid laminating resin.

4. By properly choosing the laminating resin, sparkle can be controlled.

5. The use of silicone resin and/or epoxy resin does not require special ventilating or explosion proof equipment, or $CO_2$ fire-extinguishing considerations.

What is claimed is:

1. A method for laminating a transparent safety panel to a screen-bearing viewing window of a CRT comprising:

positioning said panel in a prescribed relationship with said window to provide a space therebetween, producing a mechanically-strong, hydraulically-tight closure between said window and said positioned panel around a margin of said panel by forcing a caulking material between said window and said panel, whereby said panel is bonded to said window, orienting said window with said panel bonded thereto in a generally vertical attitude relative to a horizontal plane, filling substantially all of the space between said window and said panel with liquid resin that is curable upon exposure to ultraviolet radiation, and curing said liquid resin to an optically-transparent solid material adhered to said window and said panel by exposing said liquid resin to ultraviolet radiation.

2. The method defined in claim 1, wherein said prescribed relationship is determined by at least three spacers disposed between one said window and said panel.

3. The method defined in claim 2, wherein said spacers are attached to said panel.

4. The method defined in claim 2, wherein said spacers consist essentially of said liquid resin cured to solid material.

5. The method defined in claim 1, including, prior to said filling step, baking said closure at temperatures up to about 150° C. for time intervals sufficient to prevent subsequent outgassing of said closure during said filling and curing steps.

6. The method defined in claim 1, wherein said caulking material consists essentially of a viscous silicone resin that is curable at room temperature to a solid.

7. The method defined in claim 1, including leaving a fill hole at one portion of said closure, orienting said window in said generally vertical attitude with said fill hole on the upper side of said window, and filling said space by pouring said liquid resin through said fill hole.

8. The method defined in claim 1, wherein said liquid resin is a degassed slow-curing mixture of silicone resin and catalyst therefor.

9. A method for assembling a transparent safety panel to a faceplate of a cathode-ray tube, said faceplate including a screen-bearing viewing window having a plurality of edges, an external contour and an integral peripheral flange, and said panel having a plurality of edges, an inner surface with an internal contour conforming substantially to said external window contour and having overall dimensions that are similar to those of said viewing window, the steps comprising positioning said panel with the inner surface thereof in prescribed relationship with an outer surface of said window and with the edges thereof aligned with the edges of said faceplate to provide a space between said panel and said faceplate, introducing a viscous caulking material between said panel and said faceplate only along margins extending inwardly from said edges thereof in such a manner as to adhere thereto and to close the space therebetween, curing said caulking material to a solid first bonding material that provides a mechanically-strong, hydraulically-tight closure, baking said cured caulking material at temperatures up to about 150° C. in air for a sufficient time to prevent outgassing of said cured caulking material, filling substantially all of the space remaining between said faceplate and said panel with a curable liquid resin, and curing said liquid resin between said panel and said faceplate to a light-transparent second bonding material.

10. The method defined in claim 9, including casting spacers of prescribed thickness of said second bonding material, and attaching a plurality of said spacers in the margins of said faceplate and said panel.

11. The method defined in claim 9, wherein said remaining space is filled while said window is in a generally vertical attitude.

12. A method for laminating a transparent safety panel to a screen-bearing viewing window of a CRT comprising positioning said panel in a prescribed relationship with said window to provide a space therebetween, producing a mechanically-strong, hydraulically-tight closure between said window and said positioned panel around a margin of said panel, whereby said panel is bonded to said window, baking said closure at temperatures up to about 150° C. for time intervals sufficient to prevent subsequent outgassing of said closure, orienting said window with said panel bonded thereto in a generally vertical attitude relative to a horizontal plane, filling substantially all of the space between said window and said panel with curable liquid resin, and curing said liquid resin to an optically-transparent solid material adhered to said window and said panel.

13. The method defined in claim 12, wherein said liquid resin is curable upon exposure to ultraviolet radiation and said curing step includes exposing said liquid resin to ultraviolet radiation.

* * * * *